United States Patent [19]

Jarchow et al.

[11] Patent Number: 5,403,241

[45] Date of Patent: Apr. 4, 1995

[54] INFINITELY VARIABLE HYDROSTATIC MECHANICAL POWER SHIFT GEARBOX

[75] Inventors: Friedrich Jarchow, Essen; Peter Tenberge, Friedrichshafen; Dietrich Haensel, Bochum; Peter Döttger, Herne, all of Germany

[73] Assignee: Friedrich Jarchow, Germany

[21] Appl. No.: 212,314

[22] Filed: Mar. 14, 1994

Related U.S. Application Data

[63] Continuation of Ser. No. 962,614, Oct. 16, 1992, abandoned, which is a continuation of Ser. No. 840,578, Feb. 24, 1992, abandoned, which is a continuation of Ser. No. 634,955, Dec. 28, 1990, abandoned, which is a continuation of Ser. No. 540,305, Jun. 18, 1990, abandoned, which is a continuation of Ser. No. 391,735, Aug. 8, 1989, abandoned, which is a continuation of Ser. No. 192,345, May 10, 1988, abandoned.

[30] Foreign Application Priority Data

May 12, 1987 [DE] Germany ............... 37 15 730.2
Nov. 30, 1987 [DE] Germany ............... 37 40 501.2
Jan. 26, 1988 [DE] Germany ............... 38 02 118.8

[51] Int. Cl.⁶ ................... F16H 37/08; F16H 47/04
[52] U.S. Cl. ............................. 475/72; 475/76; 475/80; 475/81
[58] Field of Search ............... 475/72, 76, 78, 79, 475/80, 81

[56] References Cited

U.S. PATENT DOCUMENTS

| | | | |
|---|---|---|---|
| 3,580,107 | 5/1971 | Orshansky, Jr. | 74/687 |
| 3,709,060 | 1/1973 | Orshansky, Jr. | 74/687 |
| 3,884,095 | 5/1975 | Miyao et al. | 74/687 |
| 3,888,139 | 6/1975 | Orshansky, Jr. | 74/687 |
| 4,843,907 | 7/1989 | Hagin et al. | 74/687 |
| 4,976,665 | 12/1990 | Hagin et al. | 475/80 |
| 5,011,463 | 4/1991 | Jarchow et al. | 475/78 X |
| 5,052,986 | 10/1991 | Jarchow et al. | 475/72 X |
| 5,193,416 | 3/1993 | Kanayama | 475/72 X |
| 5,207,736 | 5/1993 | Fredriksen | 475/72 X |

FOREIGN PATENT DOCUMENTS

| | | | |
|---|---|---|---|
| 0143365 | 6/1985 | European Pat. Off. | 74/687 |
| 0195452 | 9/1986 | European Pat. Off. | 74/687 |
| 450282 | 10/1991 | European Pat. Off. | 475/72 |
| 2147447 | 6/1984 | Germany . | |
| 3147447 | 6/1984 | Germany . | |
| 3838768 | 6/1989 | Germany | 475/80 |
| 4115623 | 11/1992 | Germany | 475/72 |
| 4200692 | 7/1993 | Germany | 475/72 |
| 92009829 | 6/1992 | WIPO | 475/78 |

Primary Examiner—Dirk Wright
Assistant Examiner—Khoi Q. Ta
Attorney, Agent, or Firm—Kinney & Lange

[57] ABSTRACT

The gearbox includes a multi-shaft toothed-wheel planetary gearing and a continuously adjustable hydrostatic transmission having toothed-wheel auxiliary transmission stages and gear-changing clutches. The hydrostatic transmission is associated with a displacement-type machine with constant displacement volume. In the planetary gearing, one shaft forms the input shaft to which the adjustable displacement-type machine is connected. A second shaft of the planetary gearing is connected to the constant-volume displacement-type machine. Third and fourth shafts of the planetary gearing represent coupling shafts. The coupling shafts alternately act via at least two auxiliary transmission stages, also called gears, on the output shaft. The coupling shafts change their speeds in such a manner that one coupling shaft becomes steadily faster and the other one becomes steadily slower. They behave in such a manner that they exhibit equal speeds in one extreme position. In the extreme positions of the hydrostatic transmission, gear-changing clutches handle the gear change free of load and without interruption of traction force when the speeds are synchronous. The automatic transmission is controlled and regulated by electronic and hydraulic means.

10 Claims, 8 Drawing Sheets

INFINITELY VARIABLE HYDROSTATIC MECHANICAL POWER SHIFT GEARBOX

This is a continuation of application Ser. No. 07/962,614, filed Oct. 16, 1992, abandoned as of the date of this application; which was a continuation of application Ser. No. 07/840,578, filed on Feb. 24, 1992, (now abandoned); which was a continuation of application Ser. No. 07/634,955, filed on Dec. 28, 1990, (now abandoned); which was a continuation of application Ser. No. 07/540,305, filed on Jun. 18, 1990 (now abandoned); which was a continuation of application Ser. No. 07/391,735, filed on Aug. 8, 1989, (now abandoned); which was a continuation of application Ser. No. 07/192,345, filed May 10, 1988, (now abandoned).

BACKGROUND OF THE INVENTION

Infinitely variable hydrostatic-mechanical power shift gearboxes are advantageously suitable for motor vehicles since they can be continuously adjusted within wide ranges and, in addition, have good efficiencies. The relatively wide range of adjustment allows the internal combustion engine to be operated on preferred characteristics. Such characteristics can be, for example, the curve for minimum fuel consumption or a line for good acceleration behavior.

The present invention represents a further development of the gearboxes according to U.S. Pat. Nos. 3,580,107, 3,709,060, 3,888,139 and DE 31 47 447 C2.

FIGS. 1, 17, 18 and 20 of U.S. Pat. No. 3,580,107 discloses that the maximum hydrostatic power flow occurs at half the maximum speed of the displacement-type machines, at half the maximum displacement volume and at 0.8-times the hydrostatic pressure. The characteristic hydrostatic power resulting from these values thus is five times the effective maximum hydrostatic power, necessitating displacement-type machines of relatively large construction. The concept results in each auxiliary transmission stage having a different transmission ratio.

The infinitely variable hydrostatic-mechanical power shift gearbox according to U.S. Pat. No. 3,709,060 starts purely hydrostatically. Apart from this starting gear, it only has two other gears. As a result, the displacement-type machines are of relatively large construction. The concept results in the two auxiliary transmission stages having different transmission ratios.

The gearbox according to U.S. Pat. No. 3,888,139 has four gears with two planetary stages as auxiliary transmission stages. Here, too, starting is performed purely hydrostatically. During this process, a reactive power circulates in the gearbox which amounts to 50% of the throughout power. Overall, the concept requires a relatively large number of wheels and gear-changing clutches, which means a great expenditure.

German Patent Specification 31 47 447 C2 describes a gearbox in which starting is performed by means of a conventional friction clutch. this is why relatively small displacement-type machines are sufficient. The auxiliary transmission stages constructed as spur gear stages have the same transmission ration in each case for two adjacent gears. Toothed-wheel clutches are provided for the gear changes.

In the gearboxes according to the Patent Specifications mentioned, gear changing actions for a gear change are to occur at synchronous speeds. During a gear change, however, the power flow direction reverses in the hydrostatic transmission. during the process, the displacement-type machines exchange their functions as pump and motor. If a displacement-type machine operates as a pump in the old gear, its displacement volume must be adjusted to a greater value, for covering the leakage oil flows and for achieving synchronous speeds, than that of the theoretical displacement volume which would be present for leakage-oil-free operation. After the gear change has been effected, the displacement-type machine then acts as motor. In the near gear, its adjusted displacement volume is too great. It should now be less than its theoretical volume. as a result, the synchronous running of the transmission parts affected by the gear change is temporarily disturbed. A stress with a pressure rise arises even before the old gear is disengaged. The gear-changing force provided suddenly separates the old gear which is thus still loaded, resulting in a gear-changing jolt. If the displacement-type machine is running as a motor in the old gear, its displacement volume is too small in the near gear where it acts as a pump. This also causes a jolt.

Engaging a new gear at synchronous speeds can be impeded by the fact that tooth is facing tooth in the gear-changing clutch. Due to dynamically caused overshooting of the volume-controlled displacement-type machine, synchronous running can be disturbed so that the new gear is not engaged.

The gear-changing forces for actuating the gear-changing clutches must be dimensioned in such a manner that immediately after the load is displaced from the old to the new gear, which is effected by a corresponding change in displacement volume, the old gear is disengaged free of torque. If the gear-changing force is too great, the old gear would be prematurely pulled out. This would be associated with jolting and wear. If the gear-changing force is too small, it would not be adequate for separating the gear-changing clutch. The gear-changing forces are provided by gear-changing cylinders which are supplied by the feed circuit of the hydrostatic transmission. The feed pressure depends on the operating conditions. However, a fluctuating feed pressure also results in variable gear-changing forces and thus disturbs jolt-free gear changing.

Multiple-disk gear-changing clutches which are provided in the figures of U.S. Pat. Nos. 3,709,060 and 3,888,139 can compensate differential speeds by slipping and can be changed in overlapping manner for high gear-changing quality. However, multiple-disk gear-changing clutches are much larger compared with toothed-wheel gear-changing clutches and generate idling power losses in the opened condition which decrease the efficiency of the transmission.

However, the use of toothed-wheel gear-changing clutches requires particular control and constructional measures to achieve good gear-changing qualities. U.S. Pat. No. 3,580,107 and DE 3 147 447 C7 do not provide any indications as to how the disturbance effects described above can be eliminated.

The gearbox according to German Patent Specification 3 147 447 C2 comes closest to the present invention. It has the following objects:
  shorter constructional length so that it can also be installed in vehicles having a transverse engine
  reduction in constructional expenditure
  continuously variable reverse of the vehicle and utilization of the gears provided both for forward and for reverse travelling as can be required in the case of construction machines and tractors improvement in the gear-changing quality, that is to say avoidance of gear-changing jolts.

SUMMARY OF THE INVENTION

The gearbox contains multi-shaft toothed-wheel planetary gearing. This is composed of two or three coupled planetary stages. One shaft of the multi-shaft planetary gearing forms the input shaft. An adjustable-volume displacement-type machine is connected to this shaft via toothed-wheels. A constant-volume displacement-type machine is connected to a second shaft of the multi-shaft planetary gearing. Both displacement-type machines belong to a continuously adjustable hydrostatic transmission with a hydrostatic circuit. Two other shafts of the multi-shaft planetary gearing represent coupling shafts.

In one extreme position of the hydrostatic transmission, these two coupling shafts have the same speeds. When the hydrostatic transmission is adjusted into the other extreme position, one coupling shaft becomes steadily faster and the other one becomes steadily slower. There is thus a fast-running and a slow-running coupling shaft. Each of the two coupling shafts exhibits an identical ratio between its maximum and minimum speed.

Each coupling shaft can be alternately connected to at least two auxiliary transmission stages or gears via toothed-wheel gear-changing clutches. All auxiliary transmission stages act on the output shaft of the transmission. with each gear change, the coupling shafts are also changed. The gear changes occur in the extreme positions of the hydrostatic transmission.

In the extreme position of the hydrostatic transmission in which the coupling shafts have the same speeds, the multi-shaft planetary gearing circulates as a clutch. The gears to be changed here must therefore exhibit the same transmission ratio. For this reason, one auxiliary transmission stage is sufficient which is alternately connected to the fast- and slow-running coupling shaft in order to implement two gears. This concept shortens the constructional length and reduces the number of components.

Starting occurs in a starting gear. For this purpose, the constant-volume displacement-type machine can be connected to the output shaft directly via toothed wheels by means of a gear-changing clutch. This solution offers advantages when the starting power at the slipping limit of the vehicle only amounts to a fraction of the available engine power and can be provided by the hydrostatic transmission. The starting friction clutch and the reverse gear are then omitted. This saves constructional length and constructional expenditure. To reduce the number of components and thus the expenditure further, the auxiliary transmission stage for the first gear is also used for the starting gear, that is to say the neutral gear.

In the starting gear, the transmission provides the possibility of continuously variable forward and reverse movement. A reversing gear in known embodiment, provided between input shaft and multi-shaft planetary gearings allows reversing in all gears. A gear-changing toothed-wheel clutch can operate the reversing gear during operation in the starting gear.

A preferential characteristic preset in the engine map of the internal combustion engine, for example the line for minimum fuel consumption, can be represented by a function of throttle valve position in dependence on the nominal speed of the internal combustion engine or of the engine. A potentiometer connected to the gas pedal and thus also indirectly to the throttle valve supplies a particular voltage signal, called nominal voltage, for each position and thus for each nominal speed. The actual speed of the engine is determined in the form of an actual voltage wit the aid of an inductive pickup. the two voltages are compared in an electronic component acting as a subtractor. An electronic controller drives a 4/3-way proportional valve for adjusting the displacement volume in such a manner that the gear transmission ration is reduced if the actual voltage is higher than the nominal voltage and, conversely, the transmission ratio is increased if the actual voltage is lower than the nominal voltage.

The speed of the adjustable-volume displacement-type machine corresponds to the actual voltage. the speed of the constant-volume displacement-type machine is determined via a further inductive pickup, also in the form of a voltage which is also compared with the actual voltage in an electronic component. The process of gear changing begins when the voltage difference corresponds to the synchronous speeds of the clutch parts to be shifted.

The system automatically switches from the control loop for adjusting the gear transmission ratio to a control loop which adjusts the displacement volume in such a manner that the clutch parts to be shifted oscillate around the synchronous point. As a result, the new gear can be engaged without problems.

The second electronic control loop then provides that, after the new gear has been engaged and before the old gear has been disengaged, the displacement-type machine with the adjustable displacement volume is subjected to a volume correction in accordance with the relation $$V_{new} = 2V_{theoretical} - V_{old}.$$

considered with respect to the absolute value.

Each displacement volume is associated with a particular voltage deflection of the previously mentioned proportional valve. $V_{old}$ is therefore present with each gear-changing process, taking into consideration the prevailing leakage oil flows, which are dependent upon temperature, pressure, speed and wear.

The theoretical displacement volume $V_{theoretical}$ is constant, that is to say independent of the operating conditions and can be experimentally determined. with the vehicle jacked up, synchronous speeds of the clutch parts of the gears concerned are adjusted in idling, for example first in first gear for the transition to second gear and then in second gear for the transition to first gear. during the first process, the adjustable-volume displacement-type machine acts as pump with $V_1$, $V_{theoretical}$. Since in both cases the leakage oil flows are relatively small and almost equal, it follows that $$V_{theoretical} = 0.5(V_1 + V_2).$$

After volume correction and disengaging of the old gear, the control loop for adjusting the transmission ratio of the gearbox comes into action again.

To ensure constant gear-changing forces even with fluctuating feed pressure, a pressure reducing valve, which ensures a constant pressure in its output line, is located in the feed line to the gear-changing valves for the gear-changing cylinders of the gears.

The electronic control system also provides that the displacement volume is adjusted from zero to a small value for the purpose of engaging the neutral gear. As a result, the teeth are opposite the gaps in the case of the gear-changing clutch concerned and as a result the gear-changing process can be performed.

In a further development of the invention, it is provided for improving the gear-changing quality that the slow- and fast-running coupling shaft can be separated and also closed again in each case by means of a gear-changing multiple-disk clutch. In addition, the starting gear is provided with a gear-changing multiple-disk clutch. It is now possible to switch the toothed-wheel clutches arranged for the individual gears, which clutches now also have synchronizing elements in known manner, in a preparatory manner and only idling transmission parts have to be brought into synchronous mode. The actual gear change is performed by switching the multiple-disk clutches at synchronous speeds. This solution only needs three multiple-disk clutches for four gears and one starting gear, that is to say for five gears, only two of which clutches in each case run open which generate additional idling power losses.

The gear-changing multiple-disk clutch of the coupling shaft belonging to the first gear can then be advantageously designed in such a manner that it also serves as starting friction clutch. During the operation after completed starting, only one gear-changing multiple-disk clutch is then open in each case. Such a solution then requires a separate reverse gear.

The multi-shaft planetary gearing can then be provided, by combining three planetary stages, with a fifth shaft which provides the possibility of hydrostatic-mechanical forward and reverse starting as a result of which a greater starting torque is made available with the same constructional size of the displacement-type machines. For the fifth shaft, a starting gear-changing clutch is provided which provides the possibility of a connection to the coupling shaft associated with the first gear.

DETAILED DESCRIPTION OF PREFERRED EMBODIMENTS

Figure 1:
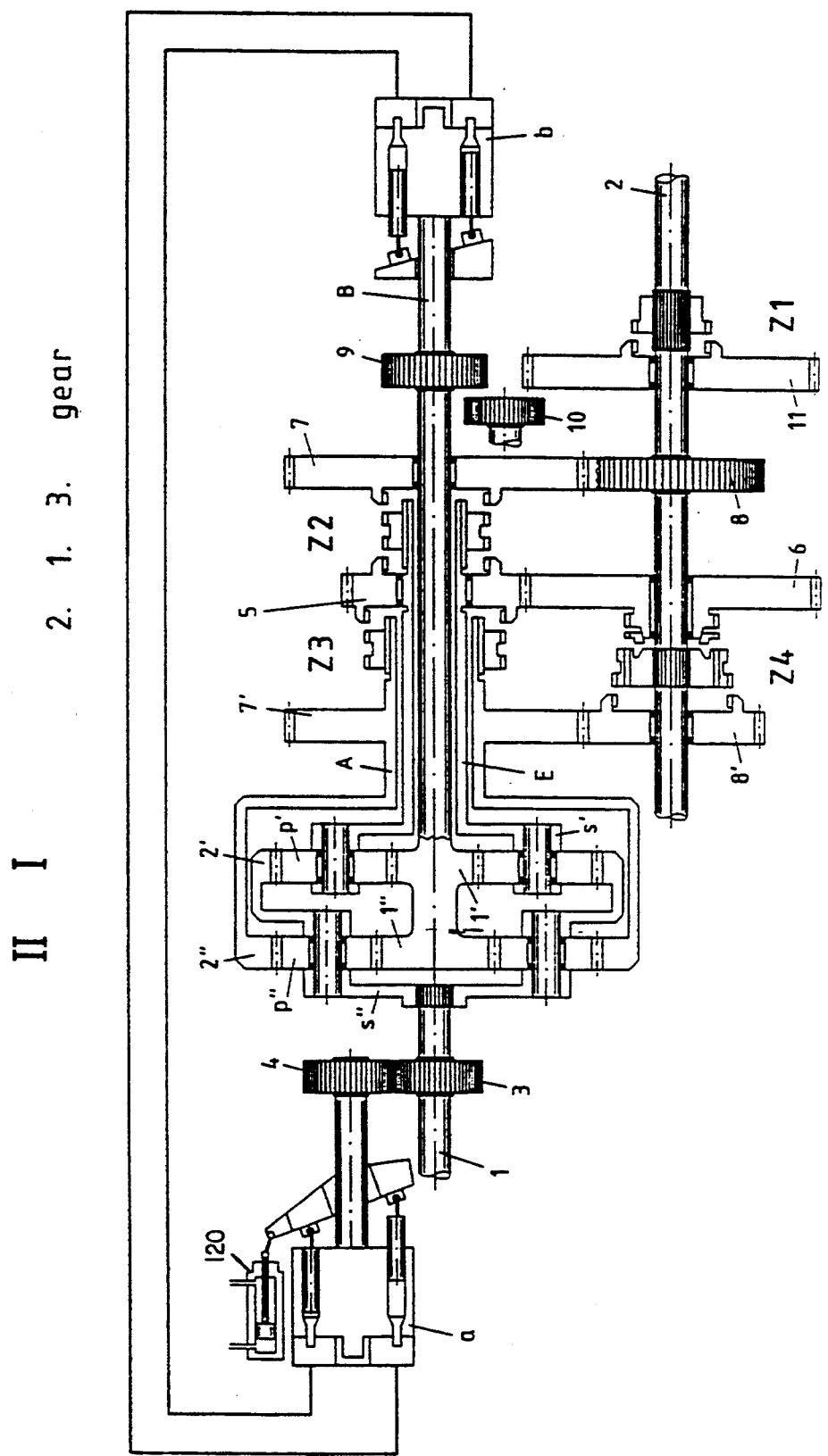
FIG. 1 shows a gearbox with four gears and one starting gear. Starting occurs purely hydrostatically in the forward or reverse direction. The same auxiliary transmission stage is used for first and second gear. The gear changes are effected by means of gear-changing toothed-wheel clutches.

The four-shaft planetary gearing of the concept according to FIG. 1 consists of a planetary stage I having a sun wheel 1' a ring gear 2' and a planet carrier s' carrying planet wheels p', and a planetary stage II having a sun wheel 1", a ring gear 2" and a planet carrier s" carrying planet wheels p". The members s" and 2' are integral with an input shaft 1; members 1' and 1" are integral with a shaft B for connection to a constant-volume displacement-type machine b; member s' is integral with a slow-running coupling shaft E; and member 2" is integral with a fast-running coupling shaft A. An adjustable-volume displacement-type machine a is connected to the input shaft 1 via toothed wheels 3, 4. A gear-changing toothed-wheel clutch Z1 can engage the neutral gear with wheels 9, 10, 11 for forward or reverse starting and thus connect the displacement-type machine b to an output shaft 2. The coupling shaft E can be connected to a double gear-changing toothed-wheel clutch Z2 via wheels 5, 6 for a first gear or via wheels 7, 8 for a third gear. The coupling shaft A can be connected to a gear-changing toothed-wheel clutch Z3 via wheels 5, 6 for a second gear and to a double gear-changing toothed-wheel clutch Z4 via wheels 7', 8' to the output shaft 2. The right-hand half of Z4 is provided with synchronizing elements to be able to switch wheel 6 in or out in preparatory manner. The detaching of wheel 6 is intended to prevent excessive loose wheel speeds of wheel 5 which would arise in the fourth gear.

Figure 2:
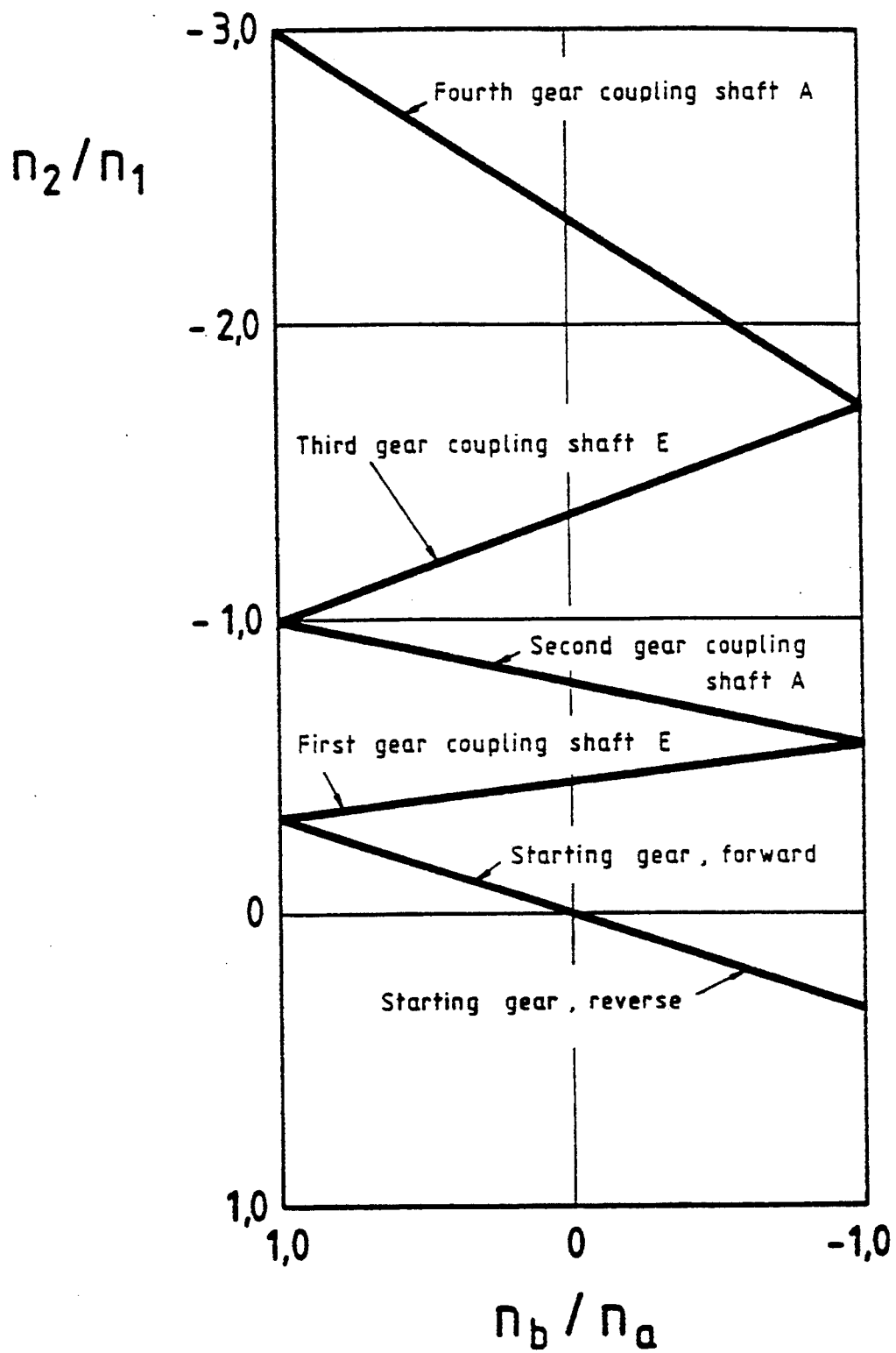
FIG. 2 represents a speed diagram for the gearbox according to FIG. 1.

FIG. 2 shows variations of speeds n for the gearbox according to FIG. 1. The diagram shows the output speed $n_2/n_1$, referred to the input speed, in dependence on the speed ratio of the displacement-type machines $n_b/n_a$ and marks the gears and coupling shafts which in each case conduct power.

In the four-shaft planetary gearing according to FIG. 3, which again consists of the planetary stages I and II, the planet carriers s' and s" are now integral with the input shaft 1; the sun wheel 1" is integral with shaft B for the connection to the displacement-type machine b; the ring gear 2' is integral with the slow-running coupling shaft E; and the sun wheel 1' with the ring gear 2" is integral with the fast-running coupling shaft A. The toothed wheels 3, 4 are used for connecting the adjustable displacement-type machine a to the input shaft 1. The coupling shaft A is now associated with first and third gear and the coupling shaft E is associated with second and fourth gear. The toothed wheels 5, 6 are now provided for neutral and first gear, toothed wheels 7, 8 for second and third gear and finally, a toothed wheel 12 running on coupling shaft A and a toothed wheel 13 integral with output shaft 2 provide for a fourth gear. The gear-changing toothed-wheel clutch Z1 is available for neutral gear, the double gear-changing toothed-wheel clutch Z2 is available for first and third gear and the double gear-changing toothed-wheel clutch Z3 is available for second and fourth gear. The gear-changing toothed-wheel clutch Z4 has synchronizing elements and is switched in preparatory manner to avoid excessive loose wheel speeds of wheel 5. In comparison with that of FIG. 1, the concept according to FIG. 3 saves three wheels, namely wheels 9, 10 and 11.

Figure 3:
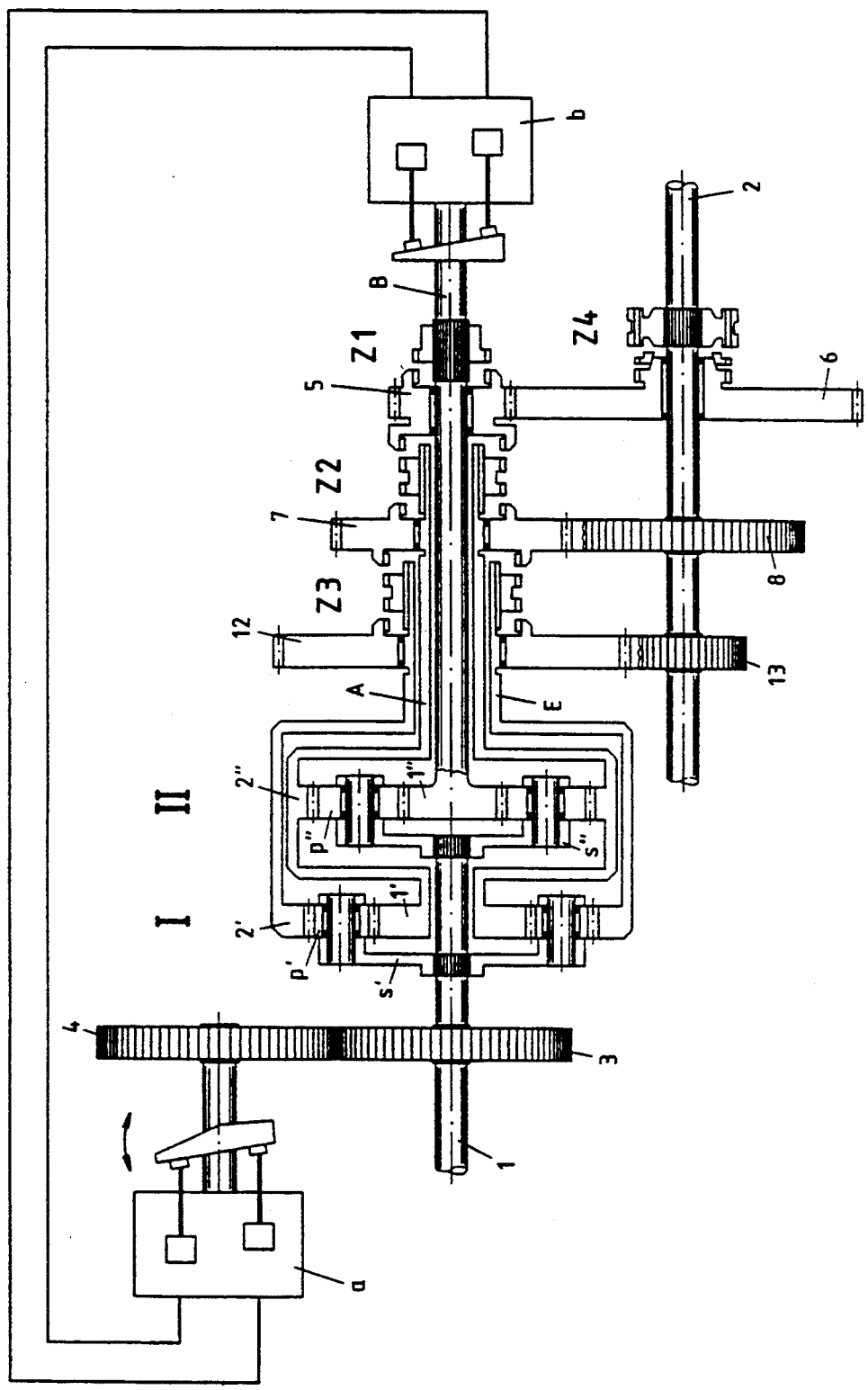
FIG. 3 shows a further development of the gearbox according to FIG. 1. The toothed wheels for the starting gear are omitted.

The gearboxes according to FIGS. 1 and 3 are of relatively short construction. They are therefore suitable, for example, for passenger vehicles having a transverse engine.

Figure 4:
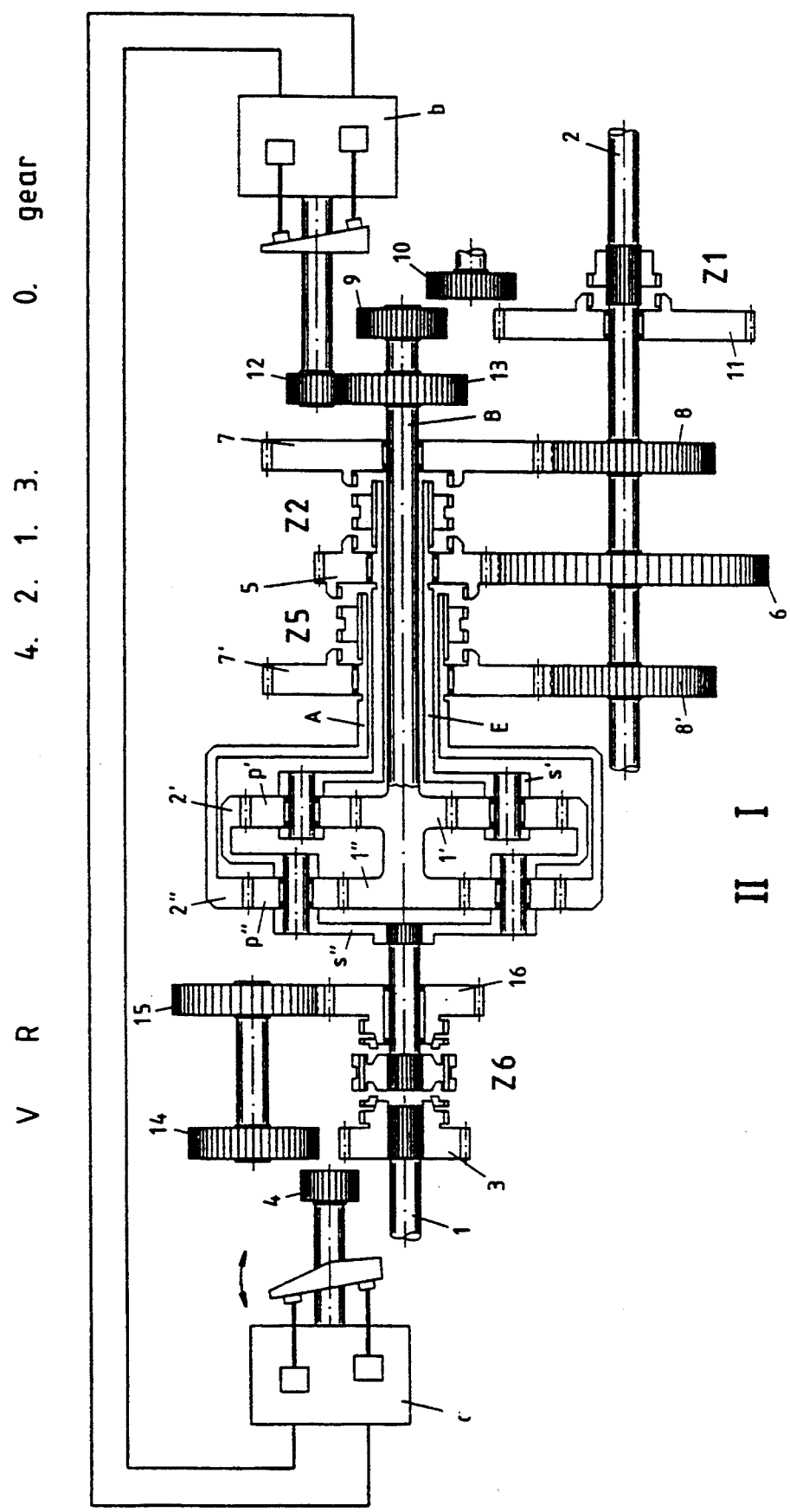
FIG. 4 shows a gearbox analogous to FIG. 1 but with a preceding reversing gear.

The gearbox according to FIG. 4 can be used, for example, for a construction machine or a tractor. The speeds of the diesel engine are much lower than those for an engine of a passenger vehicle. This is why a preparatory gear changing for avoiding excessive loose wheel speeds can be omitted. the displacement-type machines a and b must be translated to high speed. This is done by toothed wheels 3, 4 for the displacement-type machine a and by toothed wheels 12, 13 for the displacement-type machine b. a double gear-changing toothed-wheel clutch Z5 now handles the connection of the second or fourth gear. The significant difference of the gearbox according to FIG. 4 in comparison with that of FIG. 1, however, lies in a reversing gearbox arranged at the input side and having the additional wheels 14, 15 and 16 and a double gear-changing toothed-wheel clutch Z6. During the purely hydrostatic starting in neutral gear, Z6 can be shifted to forward driving V or reverse driving R in preparatory manner. For this purpose Z6 must have synchronizing elements. The concept allows all gears to be utilized for forward and reverse driving.

Figure 5:
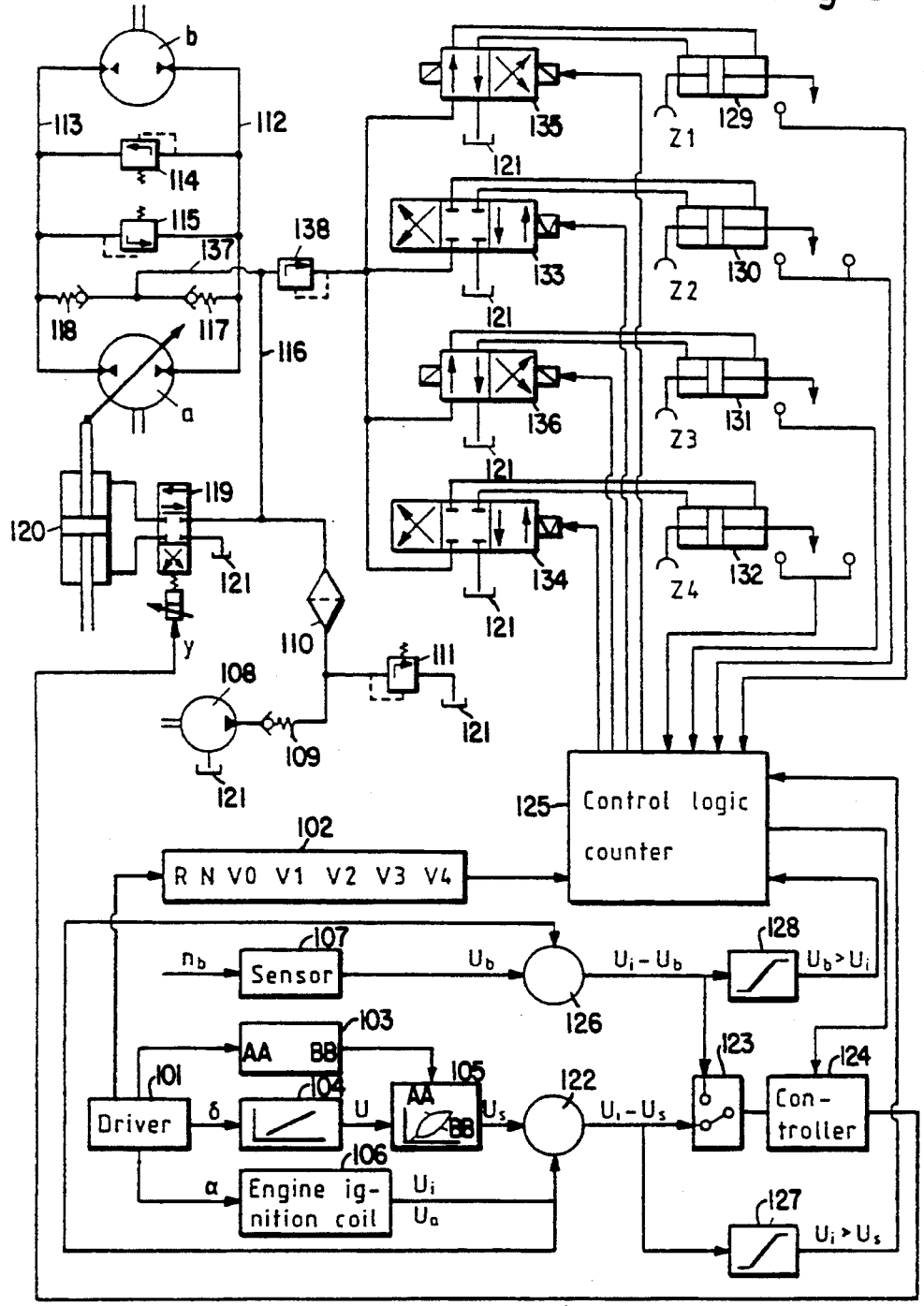
FIG. 5 represents the diagram of the control and regulating arrangement effected by electronic and hydrostatic means.

As an example, FIG. 5 diagrammatically shows the configuration of the control and regulating device for the gearbox according to FIG. 1. The hydrostatic-mechanical power shift gearbox is used as actuator for influencing the engine speed.

The driver 101 selects, via switch 102, a neutral position N, a reverse driving position R or a forward driving position V0 in operation with a neutral gear, a V1 position in operation with neutral gear and first gear, a V2 position in operation with neutral, first and second gears, a V3 position in operation with neutral, first, second and third gears or in the normal case V4 in operation with all forward gears. Via a further selection switch 103, the driver selects a characteristic AA or BB. The characteristics AA and BB are located in an engine map forming part of an electronic memory 105. Operation along AA means minimum fuel consumption and along BB means greater engine torque reserves for sports driving. Changing gears between positions V0 to V4 and between AA and BB can occur while the vehicle is moving. Operation with a reduced number of gears supports sports driving. In addition, the driver operates the accelerator with an angle $\delta$ and thus the throttle valve with an angle valve $\alpha$ The accelerator angle $\delta$ is associated via a potentiometer 104 with a voltage U which activates a voltage $U_s$ proportional to the nominal engine speed in accordance with the selected characteristic AA or BB in the electronic memory 105. The actual engine speed in each case belonging to a throttle valve angle $\alpha$ is indicated in the form of a proportional voltage $U^i$, for example with the aid of the ignition coil 106. With respect to the absolute value, the displacement-type machine a has the same speed as the engine. $U_i = U_a$ therefore also behaves in proportion to the speed of the displacement-type machine a. A sensor 107 supplies a voltage $U_b$ which is proportional to the speed of the displacement-type machine b.

A feed pump 108 delivers an oil flow via a check valve 109 and a filter 110 against a pressure limiting valve 111 into the hydrostatic circuit of the displacement-type machines a, b. Main lines 112, 113 with pressure limiting valves 114, 115 and feed line 116 with return valves 117, 118 form the hydrostatic circuit. The feed line 116 is also connected to a proportional valve 119 for adjusting an actuating piston 120 for changing the displacement-type machine volume $V_a$ of the displacement-type machine a. Leakage oil flows pass back into an oil sump 121 of the gearbox.

A subtractor 122 supplies the voltage difference $U_a$-$U_s$ via a switch 123 to a controller 124 the actuating signal y of which is fed back to the proportional valve 119. y is in proportion to the displacement volume $V_a$. A change in $V_a$ causes the transmission ratio $i_{12} = n_1/n_2$ of the hydrostatic mechanical power shift gearbox to be adjusted. Outside a predetermined tolerance, the transmission ration $i_{12}$ decreases with positive values; of $U_i$-$U_s$ ad increases with negative values of $U_i$-$U_s$. When the driver is no longer operating the gas pedal, the transmission ratio is automatically reduced. In contrast, stepping on the brake causes the transmission ratio to be increased so that the engine additionally retards.

The gear engaged is registered by a logic chip 125. If the regulating system requires a gear change, the switch 123 changes the regulating variables from $U_i$-$U_s$ to $U_1$-$U_b$ according to the invention. A subtractor 126 forms the necessary voltage difference $U_i$-$U_b$ which is adjusted to zero. The hunting a zero ensures that the gear is engaged even if this temporarily faces tooth in the gear-changing toothed-wheel clutch.

A comparator 127 decides whether $U_i$ is greater or less than $U_s$. It communicates a corresponding signal to the logic ship 125 in order to move the actuating piston 120 into the correct direction and to increment or decrement the counter by 1. The comparator 128 is the start pulse for gear changing to the logic chip 125 with $U_b$->$U_i$. Furthermore, the logic chip 125 receives signals from the distance sensors which signal the neutral or inactive position of gear-changing pistons 129, 130, 131 and 132 for the toothed-wheel clutches. In the case of a gear change, the order of 4/3-way valves 133 and 134 to be actuated and of 4/2-way valves 135 and 136 is thus established.

After a new gear has been engaged, a new drive value $y_{new} = 2y_{theoretical} - Y_{old}$, that is to say $V_{a\ new} = 2V_{a\ theoretical} - V_{a\ old}$ is now preset in accordance with the invention. $y_{theoretical}$ is available as a stored value. $Y_{old}$ corresponds to the drive value immediately after the new gear has been engaged.

The gear-changing forces for actuating the gear-changing clutches must be dimensioned in such a manner that the old gear is disengaged almost without torque immediately after the load has been displaced from the old to the new gear. If the gear-changing force is too great, the old gear would be prematurely pulled out. This would be connected with jolting and wear. If the gear-changing force is too small, this separation of the gear-changing clutch would be inadequate. The gear-changing pistons 129, 130, 131 and 132 must therefore be loaded with a correctly dimensioned constant pressure. This is why, according to the invention, a pressure reducing valve 138 is located in a feed line 137 to the gear-changing valves 133, 134, 135 and 136. It reduces to a constant value the pressure in the feed line 116 and 137 respectively which fluctuates depending on the operating condition.

If toothed faces tooth in the gear-changing toothed-wheel clutch when neutral gear is engaged, the proportional valve 119 receives, according to the invention, a pulse for slightly changing the displacement volume $V_a$ in order to ensure that shifting through occurs.

Figure 6:
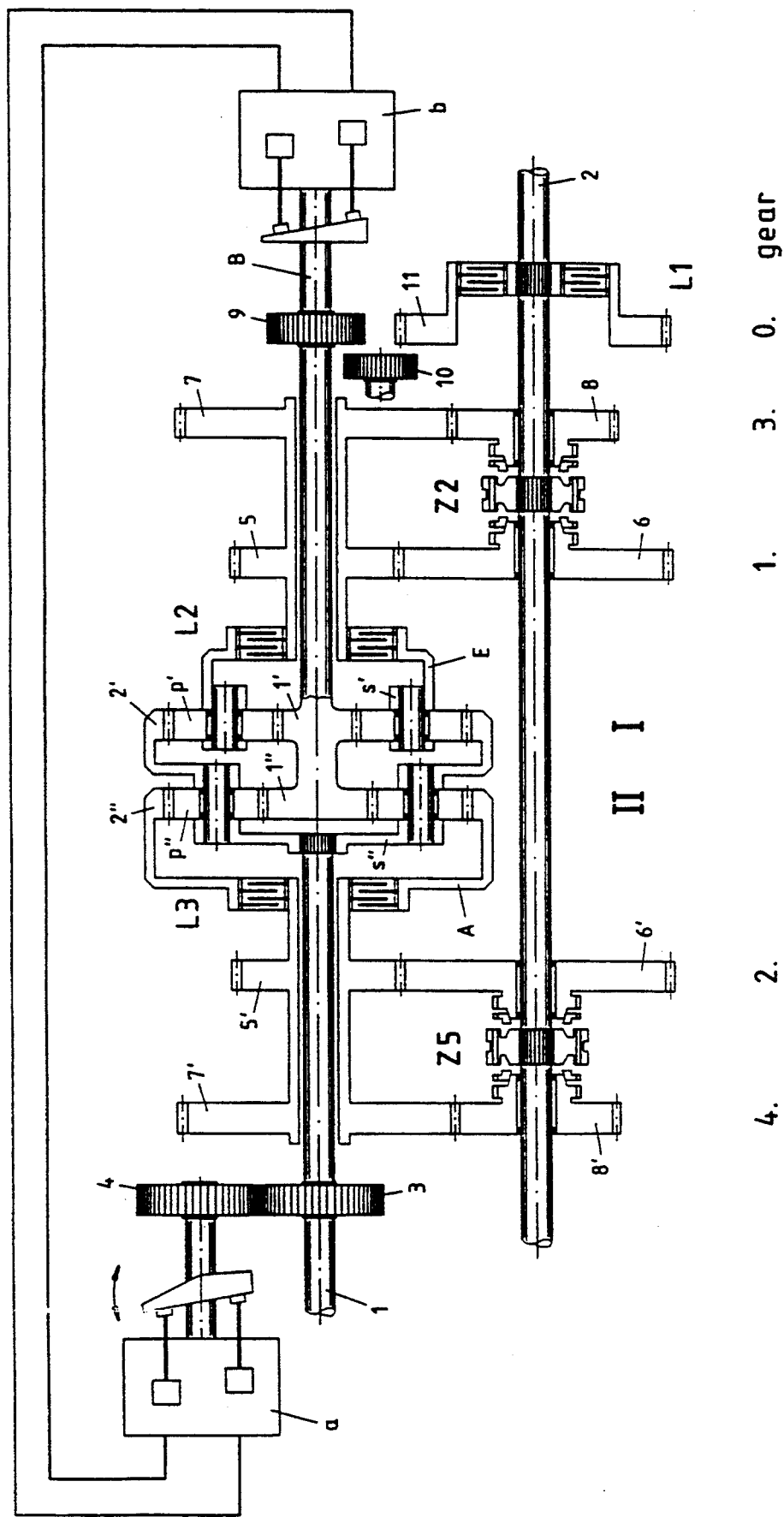
FIG. 6 contains a gearbox according to FIG. 1 but with gear-changing multiple-disk clutches in order to be able to separate or close the coupling shafts and a gear-changing multiple-disk clutch for the starting gear.

The basis of the concept according to FIG. 6 is shown in the gearbox of FIG. 1. The gear-changing toothed-wheel clutch Z1 is now replaced by a switchable multiple-disk clutch L1. In addition, the coupling shaft E is now interrupted by a gear-changing multiple-disk clutch L2 and the coupling shaft A is now interrupted by a gear-changing multiple-disk clutch L3. The double gear-changing toothed-wheel clutches Z2 for the first gear with the wheels 5, 6 and the third gear with the wheels 7, 8 and Z5 for the second gear with wheels 5', 6' and the fourth gear with the wheels 7', 8' have synchronizing elements. The multiple-disk clutches provide a jolt-free change of the gears whilst the toothed-wheel clutches execute preparatory gear-changing actions and during this process only need to synchronize idling transmission parts.

Figure 7:
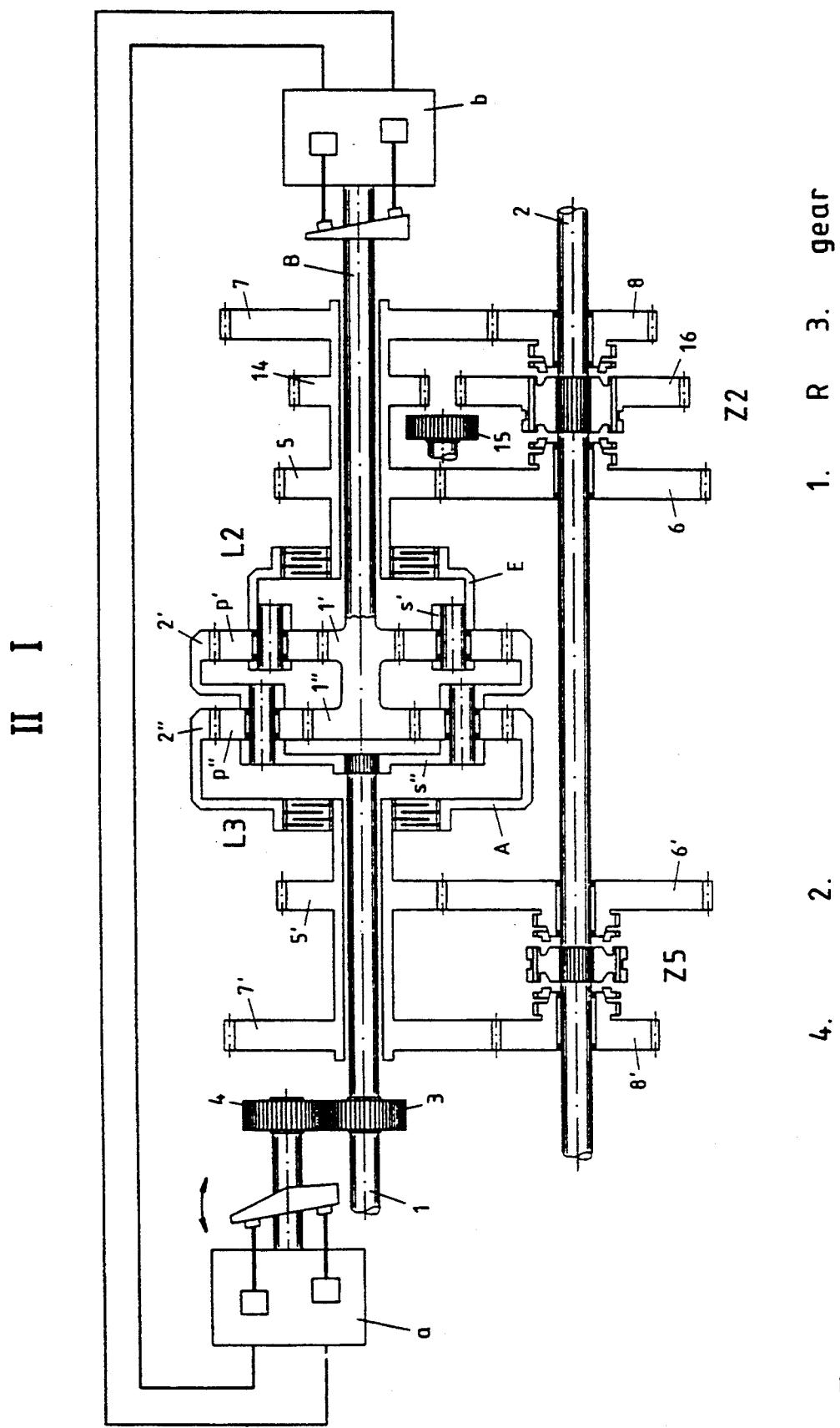
FIG. 7 simplifies the gearbox according to FIG. 6. The gear-changing multiple-disk clutch of the coupling shaft for the first gear is also used for starting. A conventional reverse gear becomes necessary.

The gearbox according to FIG. 7 follows from the gearbox according to FIG. 6. The multiple-disk clutch L2 is now also used as starting clutch. The multiple-disk clutch L1 with connecting wheels 9, 10, 11 cn thus be omitted. However, a reverse gear R is now needed which is obtained by toothed wheels 14, 15, 16, wheel 15 being constructed as sliding wheel.

Figure 8:
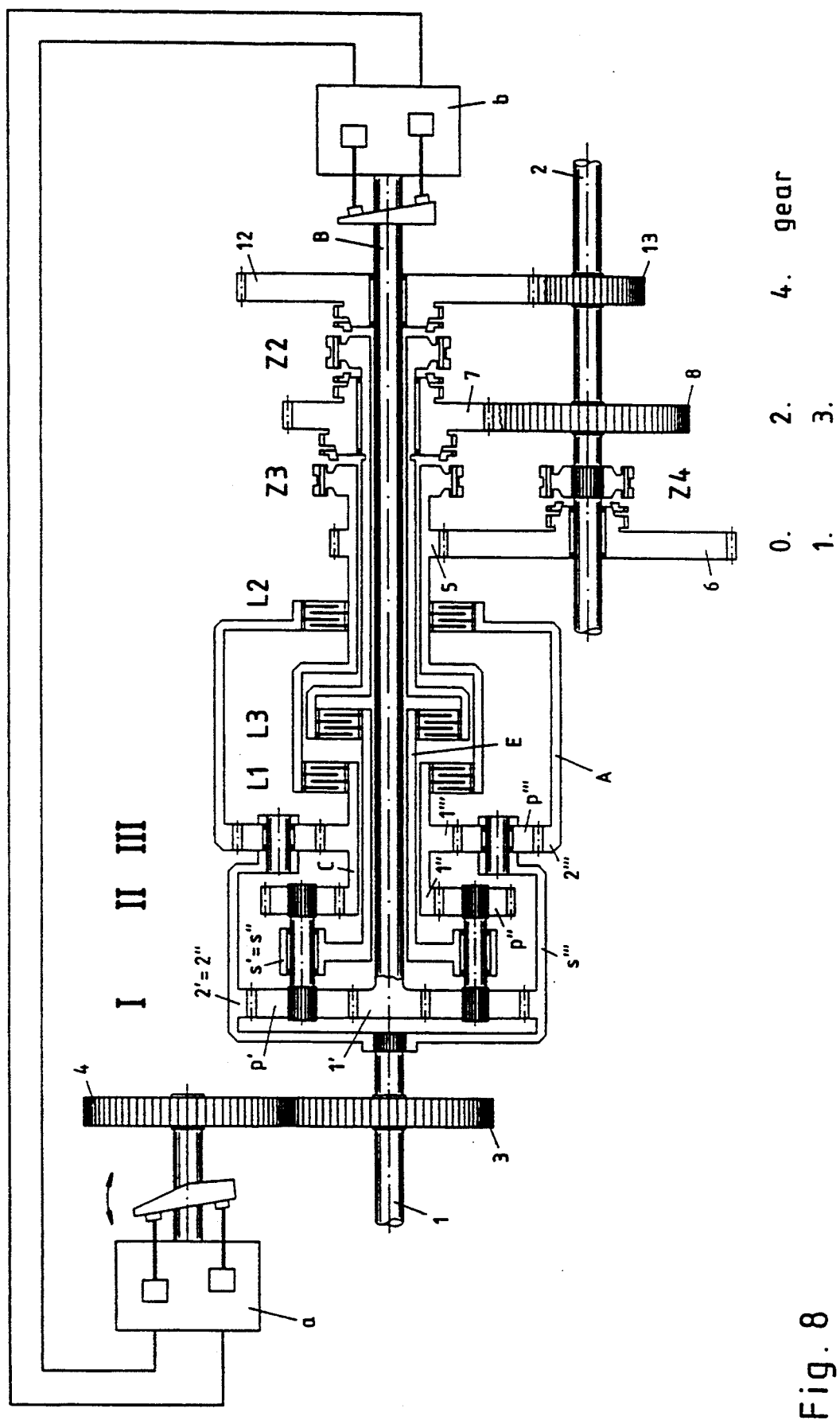
FIG. 8 shows a gearbox with five-shaft planetary gearing, the fifth shaft of which is used for the hydrostatic-mechanical starting.

In FIG. 8, the multi-shaft planetary gearing has six shafts. They are shafts 1, 2, A, B, E and a new shaft C. A third planetary stage III is introduced having a sun wheel 1''', a ring gear 2''', a planet carrier s''' and planet wheels p'''. The three planetary stages I, II and III are locked together. The same ring gear serves both as stage I ring gear 2' and stage II ring gear 2''; the same planet carrier serves both as stage I planet carrier s' and stage II planet carrier s''; and the stage I planet wheels p' are concentric with an integrally connected to the stage II planet wheels p''. 2'=2' meshes with p'. The members 2'=2'' and s''' are integral with input shaft 1. 1' is integral with shaft B for the connection with the displacement-type machine b. 2''' is integral with fast-running coupling shaft A. s'=s'' is integral with slow-running coupling shaft E. Finally 1''' is integral with the new shaft C. The multiple-disk clutch L1 is provided for shaft C, multiple-disk clutch L2 is provided for the coupling shaft A and multiple-disk clutch L3 is provided for the coupling shaft E. A corresponding change-over between these clutches results in jolt-free gear changing. The double gear-changing toothed-wheel clutch Z2 and the gear-changing toothed-wheel clutches Z3 and Z4 perform preparatory gear-changing actions for the gear change. They are provided with synchronizing elements. Wheels 5, 6 and the toothed-wheel clutch Z4 belong to neutral and first gear. Wheels 7, 8 with the toothed-wheel clutch Z2 belong to second gear and the same wheels 7, 8 with the toothed-wheel clutch Z3 belong to third gear. Wheels 12, 13 with the toothed-wheel clutch Z2 belong to fourth gear. The switching logic provides that the multiple-disk clutch L1 is closed in neutral gear, the multiple-disk clutch L2 is closed in first and third gear and the multiple-disk clutch L3 is closed in second and fourth gear. Starting occurs hydrostatic-mechanically with the shaft C. Compared with the other ones, the advantage of this transmission concept consists in the fact that an increased starting torque is available with displacement-type machines of the same size.

The sequence of the gear-hanging actions, that is to say the switching logic for the gearboxes according to FIGS. 1, 3, 4, 6, 7 and 8 follows from Tables 1 to 6 which also contain important information on the respective design and data for examples.

Indices corresponding to the numbers and letters for the individual transmission members or to the numbers for the gears are used to identify the transmission ratios i, numbers of teeth z, torques T and powers P.

The greatest transmission ratio $i_{12\Delta}$ with respect to the absolute value and the smallest transmission ratio $i_{12\bullet}$ at the limits of the overall adjustment range in the case of hydrostatic-mechanical operation, that is to say without the starting range, form the overall adjustment ratio $$y_g = i_{12\Delta}/i_{12\bullet}.$$

With the number of gears q, it follows for the individual actuating ratio that $$\phi = \sqrt[q]{\phi_g}$$

The relation $$\left| \frac{P_h}{P_1} \right|_{max} = \frac{\phi - 1}{2}$$

holds for the absolute value of the maximum hydrostatic power flow referred to the drive power $P_1$.

In the tables following
O. is the forward or reverse starting gear,
l is double-clutch left-operated
r double-clutch right-operated
x engaged gear
☐ gear to be disengaged in preparation
◯ gear to-be engaged in preparation In the case of preparatory gear-changing actions, the gear-changing actions occur in the order disengage gear, engage gear.

TABLE 1

Design relations, data and switching logic
for the gearbox according to FIG. 1.

$\phi_g = 9$; $q = 4$; $\phi = 1.73$; $i_{12\Delta} = -3$; $i_{12\bullet} = -0.33$ $$\frac{Z_{2'}}{Z_{1'}} = \frac{\phi + 1}{\phi - 1} = -3.74; \quad \frac{Z_{2''}}{Z_{1''}} = -\frac{2}{\phi - 1} = -2.74$$

$$i_{0.} = i_{911} = \frac{Z_{11}}{Z_9} = 3; \quad i_{1.} = i_{2.} = -\frac{Z_6}{Z_5} = \frac{i_{12\Delta}}{\phi} = -1.73$$

$$i_{3.} = i_{4.} = -\frac{Z_8}{Z_7} = -\frac{Z_{8'}}{Z_{7'}} = \frac{i_{12\Delta}}{\phi^3} = -0.58;$$

$$i_{34} = -\frac{Z_4}{Z_3} = -1$$

$|P_h/P_1|_{max} = 0.365$

| | | Clutch | | | | |
|---|---|---|---|---|---|---|
| | | Z₂ | | | Z₄ | |
| Gear | Z₁ | l | r | Z₃ | l | r |
| 0. | x | | | | | x |
| 1. | | x | | | | x |
| 2. | | | | x | | x |
| 3. | | | x | | | ☒ |
| 4. | | | | | x | |
| 3. | | | x | | | ⓧ |

TABLE 1-continued

Design relations, data and switching logic for the gearbox according to FIG. 1.

| | | | | | |
|---|---|---|---|---|---|
| 2. | | | x | | x |
| 1. | | x | | | x |
| 0. | x | | | | x |

TABLE 2

Design relations, data and switching logic for the gearbox according to FIG. 3.

$\phi_g = 9;\ q = 4;\ \phi = 1.73;\ i_{12\Delta} = -3;\ i_{12*} = -0.33$ $$\frac{Z_{2'}}{Z_{1'}} = -\phi = -1.73;\ \frac{Z_{2''}}{Z_{1''}} = -2.74$$

$$i_{0.} = i_{1.} = -\frac{Z_6}{Z_5} = i_{12\Delta} = -3;$$

$$i_{2.} = i_{3.} = -\frac{Z_8}{Z_7} = \frac{i_{12\Delta}}{\phi^2} = -1$$

$$i_{4.} = -\frac{Z_{13}}{Z_{12}} = \frac{i_{12\Delta}}{\phi^4} = i_{12*} = -0.33;\ i_{34} = -\frac{Z_4}{Z_3} = -1$$

$|P_h/P_1|_{max} = 0.365$

| | | Clutch | | | | |
|---|---|---|---|---|---|---|
| | | Z2 | | Z3 | | |
| Gear | Z1 | l | r | l | r | Z4 |
| 0. | x | | | | | x |
| 1. | | | x | | | x |
| 2. | | | | | x | ☒ |
| 3. | x | | | | | |
| 4. | | | | x | | |
| 3. | x | | | | | |
| 2. | | | | | x | ⓧ |
| 1. | | | x | | | x |
| 0. | x | | | | | x |

TABLE 3

Design relations, data and switching logic for the gearbox according to FIG. 4

$\phi_g = 10;\ q = 4;\ \phi = 1.78;\ i_{12\Delta} = -3.4;\ i_{12*} = -0.34$ $$\frac{Z_{2'}}{Z_{1'}} = -\frac{\phi + 1}{\phi - 1} = -3.56;\ \frac{Z_{2''}}{Z_{1''}} = -\frac{2}{\phi - 1} = -2.56$$

$$i_{0.} = i_{12\ 11} = -\frac{Z_{13}}{Z_{12}}\ \frac{Z_{11}}{Z_9} = -8.88;$$

$$i_{1.} = i_{2.} = -\frac{Z_6}{Z_5} = \frac{i_{12\Delta}}{\phi} = -1.9$$

$$i_{3.} = i_{4.} = -\frac{Z_8}{Z_7} = -\frac{Z_{8'}}{Z_{7'}} = \frac{i_{12\Delta}}{\phi^3} = -0.6$$

$$i_{12\ 13} = i_{43} = -\frac{Z_3}{Z_4} = -2.6;\ i_{3\ 16} = -\frac{Z_{16}}{Z_{15}}\ \frac{Z_{14}}{Z_3} = -1$$

$\left|\frac{P_h}{P_1}\right|_{max} = 0.39$

| | | Clutch | | | | | |
|---|---|---|---|---|---|---|---|
| | | Z2 | | Z5 | | Z6 | |
| Gear | Z1 | l | r | l | r | l | r |

TABLE 3-continued

Design relations, data and switching logic for the gearbox according to FIG. 4

Reverse

| | | | | | |
|---|---|---|---|---|---|
| 0. | x | | | | ☒ |
| 1. | | x | | | x |
| 2. | | | | x | x |
| 3. | | x | | | x |
| 4. | | | x | | x |
| 3. | | x | | | x |
| 2. | | | | x | x |
| 1. | x | | | | x |
| 0. | x | | | | ⓧ |

Forward

| | | | | | |
|---|---|---|---|---|---|
| 0. | x | | | | ⓧ |
| 1. | | x | | | x |
| 2. | | | | x | x |
| 3. | | x | | | x |
| 4. | | | x | | x |
| 3. | | x | | | x |
| 2. | | | | x | x |
| 1. | x | | | | x |
| 0. | x | | | | ☒ |

TABLE 4

Design relations, data and switching logic for the gearbox according to FIG. 6.

Design relations and data as in Table 1 for the gearbox according to FIG. 1, also $$i_{1.} = i_{2.} = -\frac{Z_6}{Z_5} = -\frac{Z_{6'}}{Z_{5'}} = -1.73$$

| | | | | Clutch | | | |
|---|---|---|---|---|---|---|---|
| | | | | Z2 | | Z5 | |
| Gear | L1 | L2 | L3 | l | r | l | r |
| 0. | x | | | ⓧ | | | |
| 1 | x | | x | | | | ⓧ |
| 2. | | | x | ☒ | ⓧ | | x |
| 3. | x | | | | x | ⓧ | ☒ |
| 4. | | x | | | x | x | |
| 3. | x | | | | x | ☒ | ⓧ |
| 2. | | | x | ⓧ | ☒ | | x |
| 1. | x | | x | | | | ☒ |
| 0. | x | | | ☒ | | | |

TABLE 5

Design relations, data and switching logic for the gearbox according to FIG. 7.

Design relations and data as in Table 1 or in Table 4 for the gearbox according to FIG. 1 and according to FIG 6, respectively, also

TABLE 5-continued

Design relations, data and switching logic
for the gearbox according to FIG. 7.

$$i_R = \frac{Z_{16}}{Z_{14}} = 1.73$$

| | | | Clutch | | | | Sliding wheel |
| | | | $Z_2$ | | $Z_5$ | | |
| Gear | L2 | L3 | l | r | l | r | 15 |
|---|---|---|---|---|---|---|---|
| 1. | x | x | | | | ⓧ | |
| 2. | | x. | ☒ | ⓧ | | x | |
| 3. | x | | | x | ⓧ | ☒ | |
| 4. | | x | | x | x | | |
| 3. | x | | | x | ☒ | ⓧ | |
| 2. | | x | ⓧ | ☒ | | x | |
| 1. | x | x | | | | | ☒ |
| R | x | | | | | | x |

TABLE 6

Design relations, data and switching logic
for the gearbox according to FIG. 8.

$\phi_g = 9; q = 4; \phi = 1.73; i_{12\Delta} = -3; i_{12^*} = -0.33$ $$\frac{Z_{2'}}{Z_{1'}} = -\frac{\phi + 1}{\phi - 1} = -3.74;$$

$$\frac{Z_{2'}}{Z_{p'}} \cdot \frac{Z_{p''}}{Z_{1''}} = -\frac{2}{\phi - 1} = -2.74$$

$$\frac{Z_{2'''}}{Z_{1'''}} = -\frac{\frac{1}{\phi} + 1}{\phi - 1} = -2.16$$

$$i_0 = i_1 = -\frac{Z_6}{Z_5} = i_{12\Delta} = -3; i_2 = i_3 = -\frac{Z_8}{Z_7} = -1$$

$$i_4 = -\frac{Z_{13}}{Z_{12}} = -0.33; i_{34} = -\frac{Z_4}{Z_3} = -1$$

$$|P_h/P_1|_{max} = 0.365; T_{1''} = -\frac{2\phi}{\phi + 1} T_{1'} = -1.27 T_{1'}$$

| | | | | Clutch | | | |
| | | | | $Z_2$ | | | |
| Gear | L1 | L2 | L3 | l | r | Z3 | Z4 |
|---|---|---|---|---|---|---|---|
| 0. | x | | | | | | x |
| 1. | | x | | ⓧ | | | x |
| 2. | | | x | x | | ⓧ | ☒ |
| 3. | | x | | ☒ | ⓧ | x | |
| 4. | | | x | x | x | | |
| 3. | | x | | ⓧ | ☒ | x | |
| 2. | | | x | x | x | ☒ | ⓧ |

TABLE 6-continued

Design relations, data and switching logic
for the gearbox according to FIG. 8.

| 1. | x | ☒ | x |
|---|---|---|---|
| 0. | x | | x |

We claim:

1. A hydrostatic-mechanical power shift gearbox comprising:
   a continuously adjustable hydrostatic transmission comprising:
      an adjustable-volume displacement-type machine for rotating a first input shaft; and
      a constant-volume displacement-type machine for rotating a second input shaft;
   a multi-stage planetary gearing comprising:
      a slow-running coupling shaft operatively coupled to the first and second input shafts; and
      a fast-running coupling shaft operatively coupled to the first and second input shafts;
   an output shaft: and
   a plurality of toothed-wheel pairs for selectively coupling one of the coupling shafts to the output shaft,
   wherein each of the coupling shafts can be separately coupled to the output shaft by at least two toothed wheel pairs, wherein transmission stage changes occur by changing between coupling shafts, and
   wherein the toothed wheel pairs are sized so that adjacent transmission stages exhibit the same transmission ratio during a transmission stage change, such that transmission stage changes occur at synchronous coupling shaft and toothed wheel speeds.

2. The hydrostatic-mechanical power shift gear box of claim 1 wherein the multi-stage planetary gearing further comprises:
   a first planetary stage comprising:
      a ring gear concentric with and integral with the first input shaft;
      a planet carrier integral with the slow-running coupling shaft; and
      a sun wheel connected to the second input shaft; and
   a second planetary stage comprising:
      a ring gear concentric with and integral with the fast-running coupling shaft;
      a planet carrier concentric with and integral with the first input shaft; and
      a sun wheel connected to the second input shaft.

3. The hydrostatic-mechanical power shift gear box of claim 1 wherein the slow-running coupling shaft is used for a first and a third transmission stage, and the fast-running coupling shaft is used for a second and a fourth transmission stage.

4. The hydrostatic-mechanical power shift gear box of claim 3 wherein the plurality of toothed-wheel pairs comprises:
   a toothed wheel pair used for both the first transmission stage and the second transmission stage.

5. The hydrostatic-mechanical power shift gear box of claim 4 wherein the first input shaft, the second input shaft, the slow-running coupling shaft and the fast-running coupling shaft all rotate synchronously at the change between the first transmission stage and the second transmission stage.

6. The hydrostatic-mechanical power shift gear box of claim 4 wherein the first input shaft, the second input shaft, the slow-running coupling shaft and the fast-running coupling shaft all rotate synchronously at the change between the third transmission stage and the fourth transmission stage.

7. The hydrostatic-mechanical power shift gear box of claim 3 wherein the plurality of toothed-wheel pairs comprises:
   a first toothed wheel pair for coupling the slow-running coupling shaft to the output shaft for the first transmission stage; and
   a second toothed wheel pair for coupling the slow-running coupling shaft to the output shaft for the third transmission stage; and
   wherein the hydrostatic-mechanical power shift gear box further comprises:
      a gear-changing toothed-wheel clutch which selectively engages the first toothed wheel pair to the slow-running coupling shaft for the first transmission stage and the second toothed wheel pair to the slow-running coupling shaft for the third transmission stage.

8. The hydrostatic-mechanical power shift gear box of claim 1 wherein the adjustable-volume displacement-type machine comprises:
   means for adjusting an adjustable displacement-type volume V during a transmission stage change, wherein the adjustable displacement-type volume V is subjected to a volume correction in accordance with the relation $$V_{new} = 2V_{theoretical} - V_{old}.$$

9. The hydrostatic-mechanical power shift gearbox of claim 1, and further comprising:
   a toothed wheel pair for selectively coupling the second input shaft to the output shaft to provide a starting gear,
   wherein the adjustable-volume displacement-type machine has a displacement volume which is adjusted from zero to a small value for the purpose of engaging the starting gear.

10. The hydrostatic-mechanical power shift gearbox of claim 1, and further comprising:
   gear-changing, toothed-wheel clutches which selectively engage toothed wheel pairs to one of tile coupling shafts and tile output shaft, whereby operation of the clutches causes transmission stage changes, wherein the clutches are hydraulically operated by gear-changing valves controlling hydraulic communication between a hydraulic feed line and gear-changing cylinders; and
   a pressure reducing valve connected to the hydraulic feed line for ensuring constant pressure in the hydraulic feed line.

* * * * *